No. 663,105. Patented Dec. 4, 1900.
C. G. SKOOG, A. T. ROSEN & F. G. LILYGREEN.
CONVERTIBLE STOOL AND CANE.
(Application filed Feb. 27, 1900.)

(No Model.) 2 Sheets—Sheet 1.

Witnesses.
Harry Kilgore
Robert Otto

Inventors.
Carl G. Skoog,
Adolph T. Rosen,
Frank G. Lilygreen.
By their Attorneys,
Williamson & Merchant No. 663,105. Patented Dec. 4, 1900.
C. G. SKOOG, A. T. ROSEN & F. G. LILYGREEN.
CONVERTIBLE STOOL AND CANE.
(Application filed Feb. 27, 1900.)

(No Model.) 2 Sheets—Sheet 2.

Witnesses.
Harry Kilgore
Robert Otto

Inventors,
Carl G. Skoog,
Adolph T. Rosen,
Frank G. Lilygreen,
By their Attorneys,
Williamson & Merchant

THE NORRIS PETERS CO., PHOTO-LITHO., WASHINGTON, D. C.

UNITED STATES PATENT OFFICE.

CARL G. SKOOG, ADOLPH T. ROSEN, AND FRANK G. LILYGREEN, OF ST. PAUL, MINNESOTA; SAID ROSEN AND LILYGREEN ASSIGNORS TO SAID SKOOG.

CONVERTIBLE STOOL AND CANE.

SPECIFICATION forming part of Letters Patent No. 663,105, dated December 4, 1900.

Application filed February 27, 1900. Serial No. 6,675. (No model.)

*To all whom it may concern:*

Be it known that we, CARL G. SKOOG, ADOLPH T. ROSEN, and FRANK G. LILYGREEN, citizens of the United States, residing at St. Paul, in the county of Ramsey and State of Minnesota, have invented certain new and useful Improvements in Folding Stools; and we do hereby declare the following to be a full, clear, and exact description of the invention, such as will enable others skilled in the art to which it appertains to make and use the same.

Our invention has for its object to provide a folding stool of improved construction; and to this end it consists of the novel devices and combinations of devices hereinafter described, and defined in the claims.

The invention is illustrated in the accompanying drawings, wherein like characters indicate like parts throughout the several views.

Figure 1:
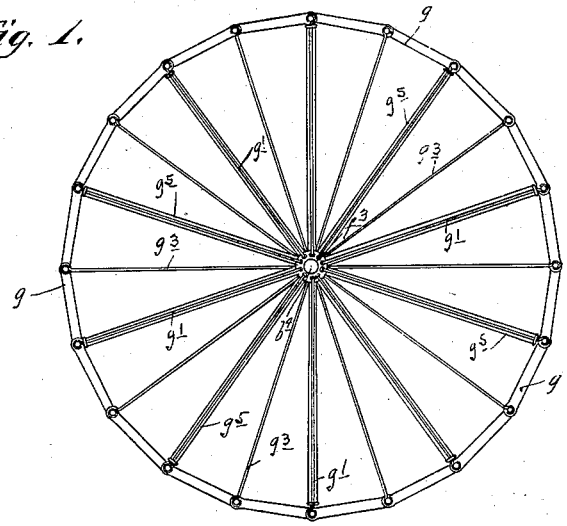
Figure 2:
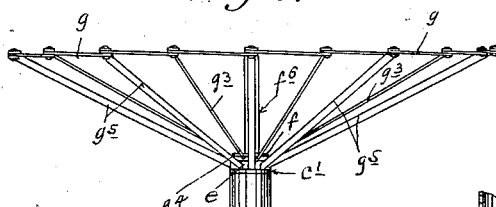
Figure 3:
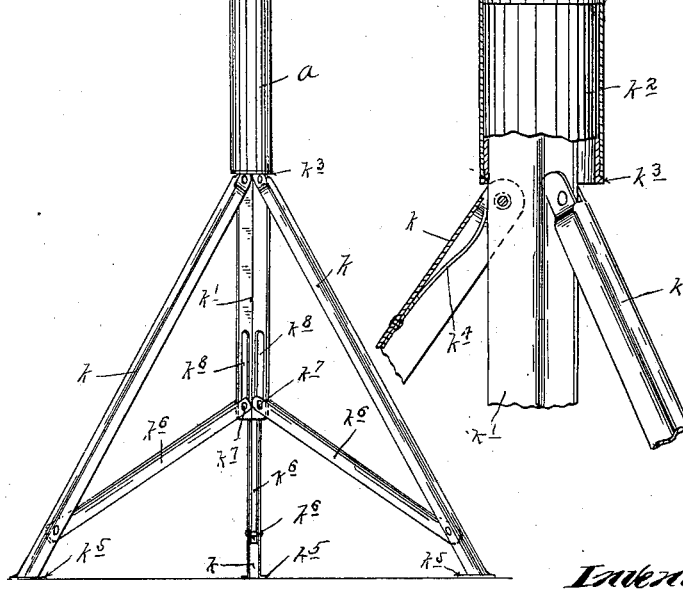
Figure 5:
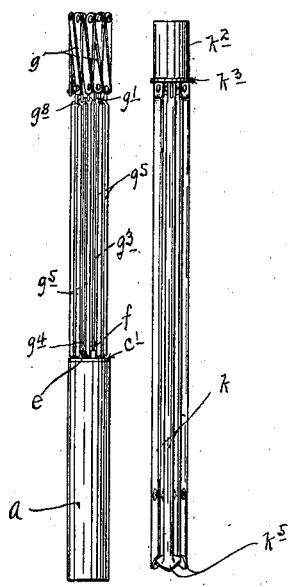
Figure 4:
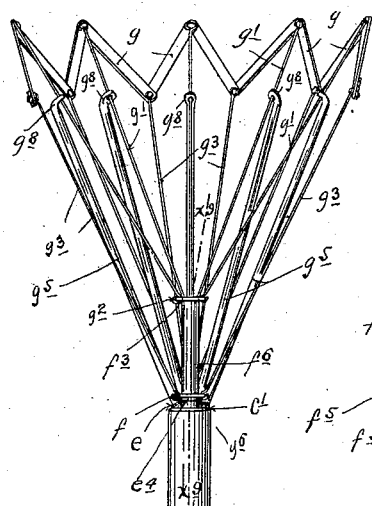
Figure 7:
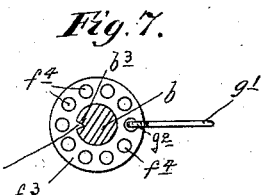
Figure 6:
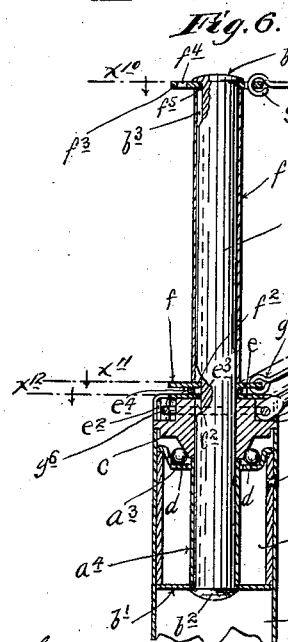
Figure 8:
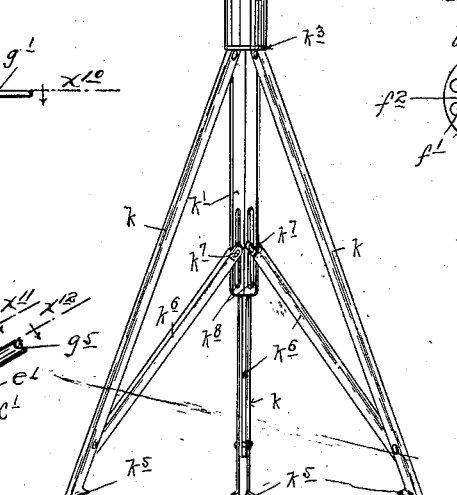
Figure 8:
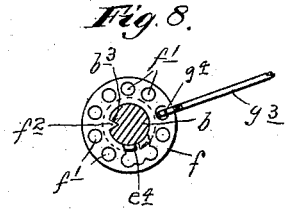

Figure 1 is a plan view showing the stool opened up. Fig. 2 is a side elevation of the stool opened as shown in Fig. 1. Fig. 3 is a detail, partly in section and partly in side elevation, showing the central portion of the stool. Fig. 4 is a view corresponding to Fig. 2, but showing both the seat and the leg portions of the stool as partially folded. Fig. 5 is a view in side elevation, showing the two sections of the stool disconnected and folded. Fig. 6 is a detail view, on an enlarged scale, principally in vertical section, on the line $x^9 x^9$ of Fig. 4, some parts being broken away and others being removed. Fig. 7 is a detail in section on the line $x^{10} x^{10}$ of Fig. 6. Fig. 8 is a horizontal section on the line $x^{11} x^{11}$ of Fig. 6, and Fig. 9 is a horizontal section on the line $x^{12} x^{12}$ of Fig. 6.

The central portion of the folding stool is in the form of a short tube $a$. Into the upper end of the tube $a$ a much shorter tube or sleeve $a'$ is driven and secured by a rivet $a^2$. (See Fig. 6.) Resting upon and supported by the upper end of the sleeve $a'$ is a ball-race or runway $a^3$, which is perforated at its center to freely pass a spacing-sleeve $a^4$. A vertical spindle $b$ snugly fits within the spacing-sleeve $a^4$, and on the lower end of said spindle $b$ is a washer $b'$, which engages the lower ends of the sleeves $a'$ and $a^4$, the same being held in position by the lower end of the said spindle, which is riveted, as shown at $b^2$. A bearing-cone $c$ is driven onto the spindle $b$, with its extreme lower end in engagement with the upper end of the spacing-sleeve $a^4$ and with its peripheral flange $c'$ loosely overlying the upper end of the tube $a$ to practically close the upper end of said tube $a$ against the entrance of dirt. Between the ball-race $a^3$ and the bearing-cone $c$ is a plurality of bearing-balls $d$. The spindle $b$ is provided with a longitudinally-extended groove $b^3$, in which a key-like projection $c^2$ of the cone $c$ engages to fix the said cone in a predetermined rotary position on the said spindle, this being done for a reason which will presently appear.

Figure 9:
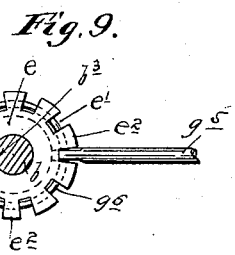

Resting directly upon the upper hub portion of the cone $c$ is a light metal cap $e$, which is formed from a metal disk having peripheral notches $e'$, with the intervening tongues $e^2$ turned downward, as best shown in Fig. 9, to form a series of spacing-partitions. This cap $e$ is also provided with a key-like projection $e^3$, which engages the longitudinally-extended groove $b^3$ of the spindle $b$ to position the said cap in its proper rotary adjustment on said spindle.

On the spindle $b$, above the cap $e$ and preferably spaced apart therefrom by a wire washer $e^4$, is a hinge-disk $f$, which is provided with a plurality of marginal perforations $f'$, as best shown in Fig. 8. This disk $f$ is also provided with a key projection $f^2$, which works in the groove $b^3$ of the spindle $b$ to properly position the said disk. At the upper end of the spindle $b$ is another hinge-disk $f^3$, provided with marginal perforations $f^4$ and a key projection $f^5$, which latter engages the groove $b^3$ of the spindle $b$. The hinge-disks $f$ and $f^3$ are spaced apart by a light sleeve $f^6$ on the spindle $b$. The parts are thus held together when the upper end of the spindle $b$ is riveted or upset, as shown at $b^4$.

The marginal portion of the seat is formed by a plurality of toggle-levers $g$, that are pivotally connected to form a flexible endless marginal band or rim. The pivotal joints between the toggle-levers are pivotally connected by suitable rivets to the outer ends of radial tension-rods $g'$, the inner ends of which tension-rods are formed with eyes or hooked ends $g^2$, that pivotally connect the same to the corresponding perforations $f^4$ of the upper hinge-disk $f^3$. In a similar manner the pivotal joints between the members of the toggle-levers are pivotally connected to the outer ends of radial toggle-breaking rods $g^3$, the inner ends of which are provided with eyes or hooks $g^4$, which pivotally connect them one to each perforation $f'$ of the lower hinge-disk $f$.

A series of compression-rods $g^5$, corresponding in number to the number of rods $g'$ and also the number of rods $g^3$, are pivotally connected at their inner ends, one within each notch $e'$ of the cap $e$, by means of a wire ring $g^6$, which is passed through suitable perforations in the flattened inner ends of the said tension-rods. This hinge-wire $g^6$ is preferably a split ring, being provided with bent ends $g^7$, which, while they prevent the ends of the tension-rods $g^5$ from slipping from the same when the parts are in working position, permit the perforated ends of the said rods to be readily threaded thereon in the process of putting together parts of the seat, and it will of course be understood that the said parts must all be put together before the ends of the spindle $b$ are riveted. At their outer ends the tension-rods $g^5$ are formed with flattened and upturned ends $g^8$, that are perforated and slide one on each tension-rod $g'$.

When the seat is spread out ready for use, as shown in Figs. 1 and 2, the perforated flattened ends $g^8$ of the compression-rods $g^5$ engage against the rounded ends of the toggle-lever sections and act as stops to prevent the downward movement of the marginal toggle-lever rim of the seat. Hence when a person sits upon the seat his weight is sustained by the tension-rods $g'$ and the compression-rods $g^5$. It is of course in the nature of this construction that the compression-rods $g^5$ should be much heavier than the tension-rods $g'$.

To fold the seat it is only necessary to force the same upward, as shown in Fig. 4, under which action the so-called "toggle breaking or buckling rods" $g^3$ simultaneously buckle all of the toggle-levers $g$ to permit the seat to be completely folded, as shown in Figs. 2 and 5. It is important to note that the said rods $g^3$ are attached at their inner ends to a part located far below the upper hinge-disk $f^3$ and in the immediate vicinity of the pivots for the inner ends of the compression-rods $g^5$. This causes the said rods $g^3$ to pull downward on the intermediate joints of the toggle-levers when the rods $g'$ and $g^5$ are folded upward. It is also important that the said lower hinge-disk $f$ or corresponding part be fixed against sliding movement on the spindle $b$, for the reason that the simple act of throwing the tension and compression rods upward breaks or buckles the toggle-levers.

The lower portion of the stool is shown in its folded position at the right in Fig. 5, but the construction thereof is better shown in Figs. 2 and 3. Three folding legs $k$, which are U-shaped in cross-section, are employed in the best arrangement of the device. At their upper ends these legs $k$ are bifurcated and are pivoted one to each flange of a three-ribbed standard $k'$, the upper end of which is rigidly secured within a thimble $k^2$, which thimble snugly fits and frictionally telescopes into the lower end of the seat-tube $a$, being provided with an annular flange $k^3$ at its lower end, which limits the downward movement thereon of the said tube $a$. Leaf-springs $k^4$, which, as shown, are secured to the legs $k$, between the flanges thereof, and engage the corresponding flanges of the standard $k'$, tend to throw the said legs radially outward to their extreme open positions. At their extreme lower ends the said legs are preferably flanged or flared outward, as shown at $k^5$, to prevent them from digging into the ground if placed on soft soil and also to prevent them from scratching a floor upon which the stool may be set. The spreading movements of the legs $k$ are limited by links $k^6$, the outer ends of which are pivoted between the flanges of the legs $k$, near their outer ends, and the inner ends of which are bifurcated and embrace the corresponding flanges of the standard $k'$, being pivoted for sliding movements thereon by rivets or pins $k^7$, which work in longitudinal slots $k^8$, cut in the flanges of said standard, as best shown in Figs. 5 and 7. The links $k^7$ are preferably U-shaped in cross-section and of such size as to permit them to fold within or between the flanges of the legs $k$. This permits the parts to be folded in the smallest possible space. The slots $k^8$ must be long enough to permit the legs to be folded together.

As shown in Fig. 5, the stool may be separated into two sections and each section be folded separately, so that the stool may be packed within very small space and may be either carried in the pocket or placed within a small case or holder provided for the same.

The stool-legs will be automatically spread or thrown apart, and if the stool be set upright the seat will spread or open up by the action of gravity, or if it should not so open at any time a slight shake will insure the action.

We are now to further consider one of the most important features of our invention, which consists in applying a ball-bearing in the stool, between the seat and the supporting-legs. These supporting-legs must in a device of this character be quite light, and they cannot be rigidly braced against lateral or torsional strains. In our many previous experiments with these folding stools we have found it impossible to provide legs of sufficient lightness and of sufficiently simple construction to make the device practicable for most purposes which would stand the lateral or torsional strains put upon them in use. A person sitting upon a stool inevitably twists his body, and these strains being transmitted through the stool would in a short time twist the legs out of shape. However, by the application of the ball-bearing a person sitting upon the seat and twisting around will simply turn the seat on the ball-bearing, and no torsional strains of any consequence will be put upon the legs. The introduction of the ball-bearing into the device not only greatly improves the action, but makes it possible to use folding legs for the stool of practicable construction for combination with a cane or of such light construction as to be adapted to be folded within small space.

The reader may receive a good idea of the compactness of the folding stool when taken apart, as shown in Fig. 5, from the statement that these two parts of the stool may be placed within a case thirteen inches long and having a transverse area of one by two inches.

What we claim, and desire to secure by Letters Patent of the United States, is as follows:

1. A folding stool, involving in combination a connected series of toggle-levers, a central spindle or stem, a series of tension-rods connecting alternate joints of said toggle-levers to said spindle or stem, a corresponding series of compression-rods pivoted to a part on said spindle and sliding at their outer ends on said tension-rods, a fixed part on said spindle below the inner ends of said tension-rod, and a series of toggle-breaking rods connecting the intermediate joints of said toggle-levers to said part fixed against sliding movement on said spindle, whereby said toggle-levers will be automatically buckled when said tension and compression rods are pressed upward, substantially as described.

2. In a folding stool, the combination with a tube $a$, of folding legs attached to the lower end thereof, the spindle $b$ having the vertically-spaced hinged disks $f$ and $f^3$, to which the folding parts of the seat are attached, the bearing-cone $c$ on said spindle, the ball-race $a^3$ and washer $b'$ on said spindle, the sleeve $a^4$ spacing said washer $b'$ and cone $c$, and the sleeve $a'$ spacing said washer $b'$ and said ball-race $a^3$, substantially as described.

3. In a stool, the combination with the seat and the standard $k'$ provided with vertically-slotted flanges, of the legs $k$ pivoted to the flanges of said standard and embracing the same, and the links $k^6$ pivoted at their outer ends between the flanges of said legs $k$ and pivoted at their inner ends in the longitudinal slots $k^8$ of said flanges, whereby when the legs are folded said links embrace said flanges, and said legs embrace said links and said flanges, substantially as described.

In testimony whereof we affix our signatures in presence of two witnesses.

CARL G. SKOOG.
ADOLPH T. ROSEN.
FRANK G. LILYGREEN.

Witnesses:
M. McGRORY,
F. D. MERCHANT.